July 4, 1939.  R. C. YANTIS  2,164,485
SLIP CLUTCH DEVICE
Filed Oct. 21, 1938  2 Sheets-Sheet 1
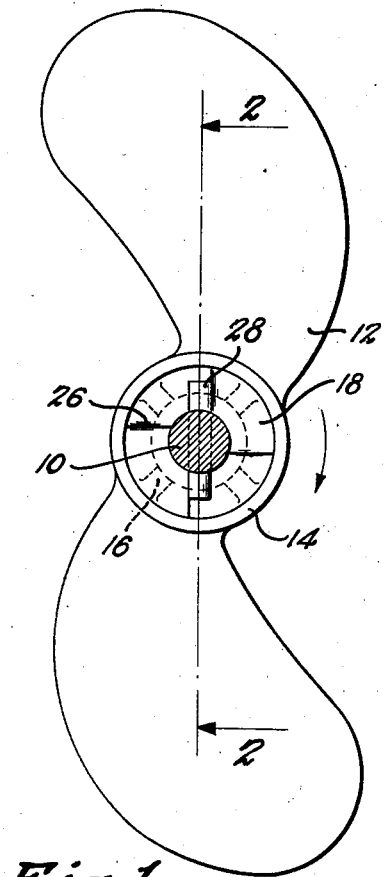
Fig. 1.
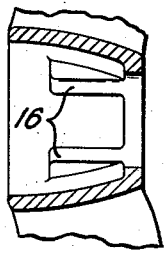
Fig. 3.
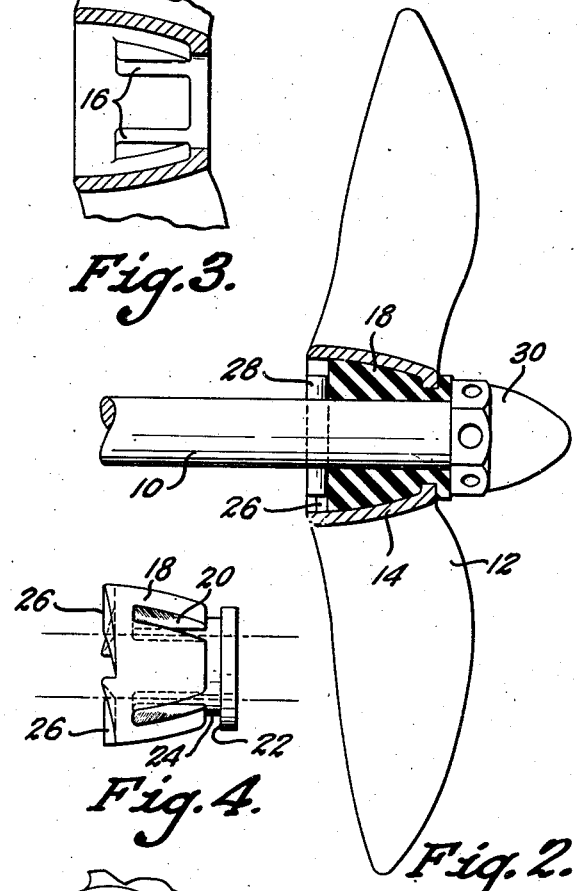
Fig. 4.
Fig. 2.
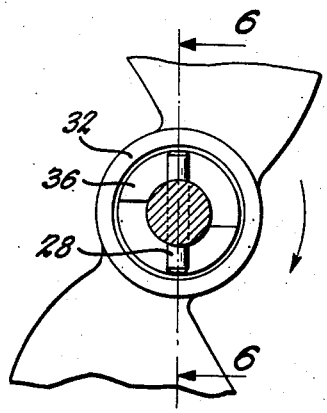
Fig. 5.
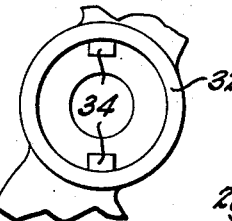
Fig. 7.
Fig. 8.
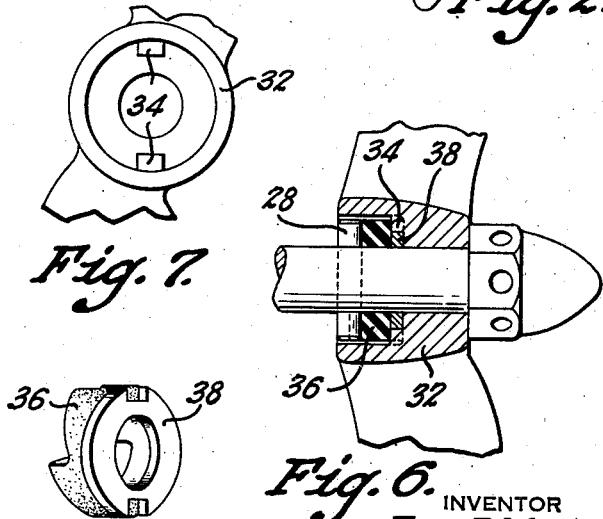
Fig. 6.
INVENTOR
Roy C. Yantis
BY
Spencer Hardman & Feler
his ATTORNEYS July 4, 1939.  R. C. YANTIS  2,164,485
SLIP CLUTCH DEVICE
Filed Oct. 21, 1938   2 Sheets—Sheet 2
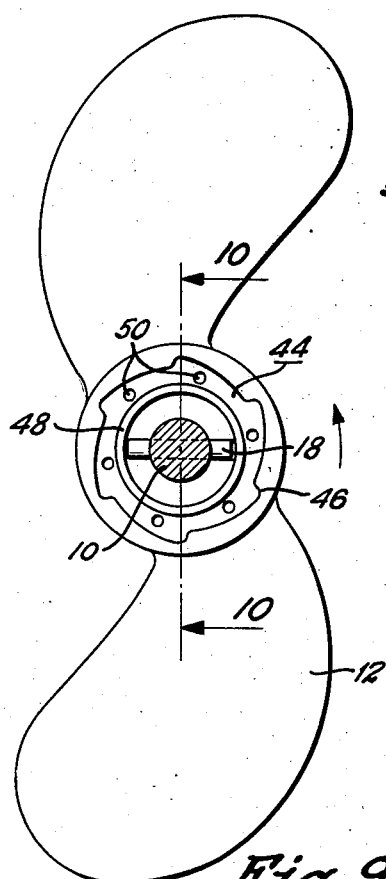
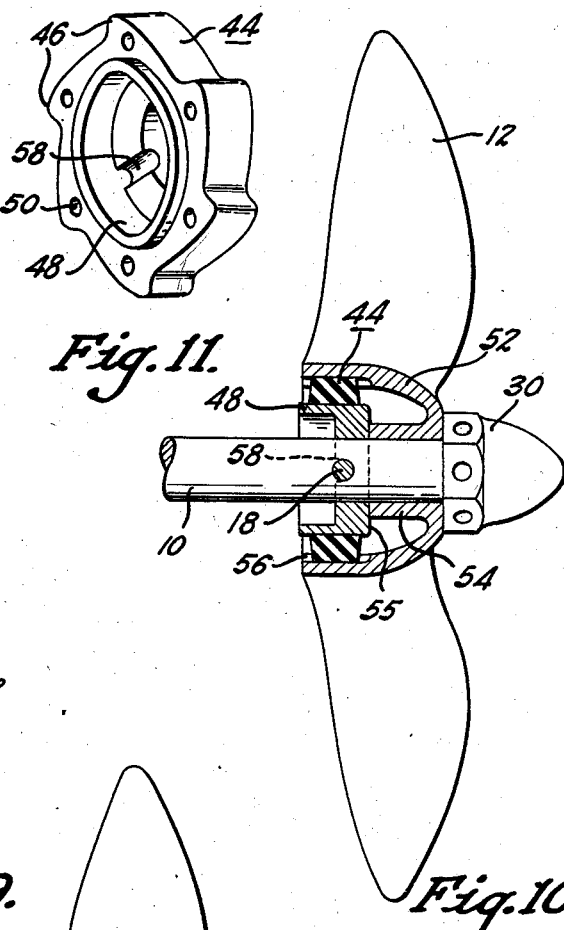
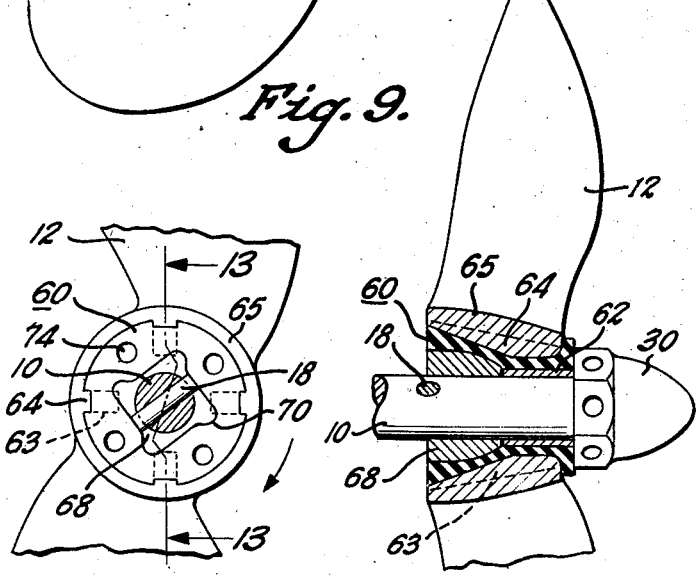
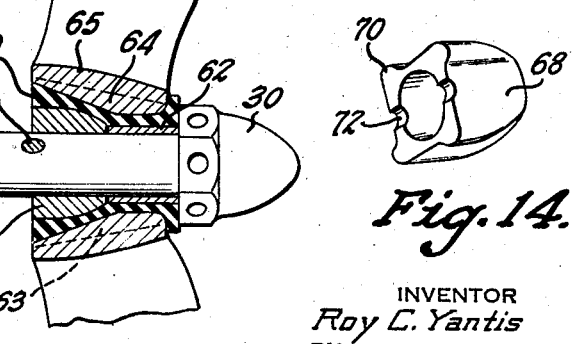
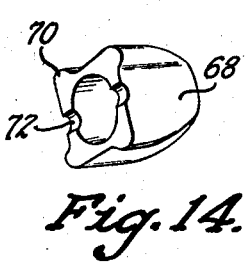
INVENTOR
Roy C. Yantis
BY
his ATTORNEYS Patented July 4, 1939

2,164,485

UNITED STATES PATENT OFFICE 2,164,485

SLIP CLUTCH DEVICE

Roy C. Yantis, Dayton, Ohio, assignor to General Motors Corporation, Detroit, Mich., a corporation of Delaware Application October 21, 1938, Serial No. 236,255

8 Claims. (Cl. 64—30)

This invention relates to slip clutches, or slip connections, between driving and driven elements, and is particularly concerned with an improved slip connection for use in propeller driving connections.

An object of the invention is to provide a torque transmission device which includes a resilient member of rubber-like material that engages a driving and a driven element, and which is constructed so as to permit a slip therebetween when the torque load on the driven element becomes excessive, engaging the elements when the torque load is reduced.

Another object of the invention is to provide a torque transmission device comprising driving and driven elements including a notched resilient portion of rubber-like material carried by one of said elements and a complementary notched engaging device carried by the other of said elements, said notched portion having sufficient resilience of distort and to slip with respect to the engaging device when the torque load is excessive, and being so arranged as to pick-up the engaging device when the torque load is reduced.

In carrying out the above objects, it is a further object to provide an annular resilient member of rubber-like material having notched or toothed portions on either the inner or outer peripheries thereof, and a complementary engaging device for fitting into said notches and thereby providing a driving connection between the elements supporting the resilient member and the engaging device.

It is still a further object in some cases to provide the notches in a face of the resilient portion which normally lies perpendicular to the axis of the driving element.

Further objects and advantages of the present invention will be apparent from the following description, reference being had to the accompanying drawings wherein preferred embodiments of the present invention are clearly shown.

The present invention, while particularly directed to propeller driving connections, may obviously be utilized in any number of applications wherein slip clutches, or slip connections, are desired to prevent injury of a driven part when said part is subjected to excessive torque loads. In propeller driving connections particularly, such a slip clutch is very desirable since the propeller is often subjected to excessive torque loads due to fouling or by engaging some hidden obstruction which completely stops the rotation of the propeller blade. In such cases, the driving shaft is subjected to excessive strains and similarly the bearings therefor have unduly high loads imposed thereon. Under these conditions the shaft may snap or the bearings may be damaged causing much expense as occasioned by replacement or repair. By the use of my improved slip connection, when the propeller becomes fouled or is stopped by a hidden obstruction, the slip connection disengages the propeller from the shaft thereby preventing any damage to either element and reengages the same when the torque load on the propeller is reduced sufficiently to assure only a normal load on the driving element.

My invention utilizes a notched resilient rubber-like member which, in the preferred form, engages a metallic part having complementary engaging surfaces thereon. When the torque load is excessive on the driven element, the notched portions on the resilient rubber-like member deform, due to compression thereof, and permit the metallic engaging part to slip thereover. It is to be understood that in the following description that the word rubber is used generically and refers to any resilient molded composition, such as any of the synthetic rubbers, fabric strengthened rubbers or synthetic rubbers, natural rubber or other resilient rubber-like compositions, since any of these compositions may be successfully utilized, the prime requirement being that the part fabricated therefrom has sufficient resilience to function properly.

In the drawings:

Fig. 1 is a plan view of a propeller, showing one form of the invention.

Fig. 2 is a view of the propeller assembly showing the hub and driving connection in axial section as taken on line 2—2 of Fig. 1.

Fig. 3 is a fragmentary view showing a section taken through the propeller hub.

Fig. 4 is a view of the rubber part utilized within the hub of the propeller.

Fig. 5 is a fragmentary plan view of a propeller assembly showing a second embodiment of the invention.

Fig. 6 is a view of the propeller assembly shown in Fig. 5, the hub and driving connection being in axial section as taken on line 6—6 of Fig. 5.

Fig. 7 is a fragmentary view of the propeller hub.

Fig. 8 is a perspective view of the rubber part used in the slip connection of the embodiment shown in Fig. 5.

Fig. 9 is a plan view of a propeller assembly showing another embodiment of the invention.

Fig. 10 is a view of the propeller assembly shown in Fig. 9, the hub and driving connections being in axial section as taken on line 10—10 of Fig. 9.

Fig. 11 is a perspective view of the rubber part used in the embodiment shown in Fig. 10.

Fig. 12 is a fragmentary plan view of still another embodiment of the invention.

Fig. 13 is a view of the propeller assembly of Fig. 12 showing the hub and driving connections taken in section as shown on line 13—13 of Fig. 12.

Fig. 14 is a perspective view of the metallic driving part used in the assembly shown in Fig. 13.

Referring to Fig. 1, 10 designates a drive shaft which constitutes the driving element. A propeller 12 is provided that has a hub 14, which includes a plurality of radially inwardly extending ribs 16 thereon. A resilient rubber member 18 is disposed to fit within the hub 14 and includes a plurality of notches 20 therein which cooperate with the ribs 16 and hold the portion 18 in non-rotative relation with the hub 14. One end of the member 18 has an engaging surface 22 thereon which protrudes outside of the hub 14 when assembled thereto. The surface 22 is associated with the remainder of the member 18 by a neck portion 24 of reduced diameter. Thus when the member 18 is assembled within the hub 14, as shown in Fig. 2, the neck portion 24 and surface 22 holds the same in fixed relation with respect to the axis of the hub, while the ribs 16 and cooperating notches 20 prevent relative rotation between member 18 and hub 14.

The end of member 18 opposite to surface 22 is molded to provide a plurality of teeth or notches 26. The teeth 26 include an inclined surface leading up to an abrupt shoulder. These teeth furnish engaging surfaces for the driven part of the driving connection. A pin 28, passed through the shaft 10, is disposed to engage teeth 26 when the shaft 10 is inserted through the rubber member 18. In order to hold the pin tightly against the member 18, a nut 30 is utilized at the outer end of the shaft 10 and may be turned down to draw the pin 28 against the notched end face of the member 18.

In operation, the normal direction of rotation of the shaft 10 is such that the pin 28 engages the abrupt shoulders of the teeth 26 and thereby drives the propeller. Thus the pin 28 and member 18 form a torque transmission device through their driving connection. When the torque load on the driven member or propeller is excessive, the teeth 26 are distorted or compressed and the pin 28 passes thereover. In this manner the shaft 10 may rotate even though the propeller 12 is held stationary. It is apparent that when the restraining force on the propeller is reduced that the teeth 26, due to their resilience, will spring out and reengage the pin 28 and cause the propeller to rotate with the shaft.

Figs. 5 through 8 show another embodiment of the invention wherein a hub 32 is provided with two or more ears 34. In this case, a rubber part 36 is preferably vulcanized to a notched metallic washer 38. The notches in washer 38 are disposed to engage the ears 34 and thus prevent relative rotation between the rubber part 36 and the hub 32. The torque transmission device, including the toothed surface of the rubber part 36 and the driving pin 28, operates in a manner similar to the operation of the device shown in Figs. 1 through 4.

Instead of having the toothed surface of the rubber part perpendicular to the shaft as hereinbefore described, it is preferable to dispose the teeth on either the inner or outer periphery of an annular rubber part, such construction being shown in Figs. 9 through 14.

Fig. 9 shows a rubber part 44 having teeth 46 on the outer periphery thereof. Part 44 is molded on, or vulcanized to, a metallic spider 48. The rubber is preferably drilled or molded as at 50 to provide more resilience in the tooth portions thereof, by permitting the rubber to distort more readily. The metallic hub 52 of the propeller has an inwardly extending bearing portion 54 thereon which abuts a thrust surface 55 on the metallic spider 48. The inner periphery of hub 52 is provided with a plurality of complementary engaging teeth 56 which fit into the teeth 46 on the outer periphery of the rubber part 44. A driving pin 10, cooperating with slot 58 in spider 48, holds the rubber part non-rotative with respect to the shaft 10, and a nut 30 of shaft 10 maintains the pin 18 in engagement with the slot 58. In the present embodiment when the torque load on the propeller is excessive, the teeth 56 on hub 52 distort the resilient teeth 46 so that a slip occurs. In this manner the shaft 10 is never subjected to any excessive strains.

Instead of having the teeth on the outer periphery of the rubber part, they may be molded on the inner periphery thereof as shown in Figs. 12 through 14. In this embodiment a rubber part 60 is provided and is substanailly of a truncated conical shape. The part 60 has a plurality of axially extending grooves 63 therein which are disposed to receive complementary ribs 64 of the metallic hub 65 of the propeller 12. The function of the ribs and grooves are to hold the rubber part non-rotative with respect to the propeller. The rubber part 60 also includes a metallic bushing 62 therein whereby the part may be passed over the shaft 10 and be freely rotatable thereupon. The inner periphery of the rubber part 60 has a plurality of notches 66 therein which are adapted to engage a complementary metal part 68 having notches or teeth 70 therearound. The part 68 has a groove 72 in one end face thereof which is disposed to engage the drive pin 18 that passes through shaft 10. Thus when the nut 30 is drawn tight, upon assembly of the propeller and shaft, it abuts the bearing 62 which in turn abuts one end of the metal part 68 and presses the other end of the metal part in tight engagement with the drive pin. The metal-to-metal contact between the bearing 62, part 68 and the nut 30 provide thrust bearing surfaces when the propeller is subjected to excessive torque loads. The function of the slip connection in the present embodiment is similar to that already explained in the form shown in Fig. 9. That is, when the torque load on the propeller is excessive the metal part 68 distorts the notches or teeth 66 in the rubber part and passes thereover, similarly when the excessive load is removed the notches or teeth 66 spring inwardly radially and reengage the complementary engaging surfaces on the metal part 68. In order to increase the resilience of the rubber part, a plurality of holes 74 may be molded or drilled therein to provide for easier distortion of the teeth 66.

When any of the embodiments described are used in a propeller assembly, the water in which the propeller is immersed acts as a satisfactory lubricant to prevent excessive wear or tearing of the rubber parts. It is apparent however that if the present torque transmission device is used on some mechanism not in contact with water, a suitable lubricant is preferably utilized to prolong the life of the rubber parts.

While the embodiments of the present invention as herein disclosed, constitute preferred forms, it is to be understood that other forms might be adopted, all coming within the scope of the claims which follow.

What is claimed is as follows:

1. A torque transmission device comprising, inner and outer elements, one of said elements being adapted to drive the other, a notched resilient rubber-like member of substantially annular shape carried by one of said elements, an engaging device carried by the other element for engaging the rubber-like member, whereby the member and the device normally rotate together, said rubber-like member having sufficient resilience in the notched portions thereof to slip with respect to the engaging device when the torque on the driven element exceeds a predetermined amount.

2. A torque transmission device comprising, a driving and a driven element, a driving connection disposed to connect said elements, said connection comprising a resilient rubber-like portion having teeth for engaging a non-resilient portion, said teeth having sufficient resilience to distort and to slip with respect to the non-resilient portion when the torque load is excessive, and being so arranged as to pick up the non-resilient portion when the torque load is reduced to a predetermined amount.

3. A torque transmission device consisting of, a member of rubber-like material and a metallic member for normally engaging the rubber-like member, said rubber-like member being so constructed and of sufficient resilience to slip with respect to the metallic member when the torque load is excessive, and to reengage therewith when the load is reduced.

4. In a propeller assembly, a drive shaft, a propeller adapted to be driven by said drive shaft and journaled thereon and relatively rotatable with respect thereto, a resilient rubber slip connection adapted to normally cause the shaft and propeller to be non-rotative with respect to one another, said rubber connection being so constructed and of sufficient resilience to disengage the propeller and the shaft when the torque load on the propeller is excessive and to reengage the propeller and the shaft when the load is reduced.

5. A torque transmission device comprising, inner and outer driving and driven motion transmission elements, and a driving connection therebetween comprising an elastically deformable cushion fixed with reference to the outer of said elements and having its inner periphery in slipping connection with the inner of said elements, said inner element having teeth for engaging complementary portions on the periphery of said member upon relative movement between said elements.

6. A torque transmission device comprising, a driving and a driven element, a driving connection disposed to connect said elements, said connection comprising a resilient annular rubber portion of truncated conical shape and including at its inner periphery a plurality of teeth, said rubber portion being in fixed relation to the driven element, a second portion fixed with relation to the driving element and having teeth engaging complementary portions thereon for connecting the driving and driven elements, said rubber portion having sufficient resilience to slip with respect to the second portion when the torque on the driven element exceeds a predetermined amount, and being so arranged to pickup the driving element when the torque load is reduced to a predetermined amount.

7. In a propeller assembly, a drive shaft, a propeller adapted to be driven by said drive shaft, a notched resilient cushion member forming a hub portion of said propeller and journaled on said shaft and relatively rotatable with respect thereto, an engaging device carried by said shaft for engaging the cushion member, whereby the member and the device normally rotate together for causing rotation of the propeller, said member having sufficient resilience in the notched portions thereof to slip with respect to the engaging device and shaft when the torque load on the propeller exceeds a predetermined amount.

8. A torque transmission device comprising in combination, a driven element including a resilient rubber hub, a driving shaft adapted to pass through said hub so that the driven element and driving shaft are rotatable with respect to one another, a notched face on said hub perpendicular to the axis of said shaft having teeth thereon presenting relatively abrupt shoulders toward one direction of rotation, and inclined faces toward the other direction of rotation, a pin passing through said shaft and engaging said teeth, means for pressing the notched face of said hub against said pin, whereby the driven element normally rotates with the shaft, said rubber hub having sufficient resilience in the notched face portion thereof for causing a slip between the shaft and the driven element when the torque load on the element exceeds a given amount.

ROY C. YANTIS.